United States Patent [19]
Schwarz

[11] 3,912,028
[45] Oct. 14, 1975

[54] PRICE-INDICATING WEIGHING MACHINE
[75] Inventor: Josef Schwarz, Balingen, Germany
[73] Assignee: Bizerba-Werke Wilhelm Kraut KG, Nalingen, Germany
[22] Filed: Jan. 24, 1975
[21] Appl. No.: 543,921

[30] Foreign Application Priority Data
Jan. 31, 1974 Germany............................ 2404521

[52] U.S. Cl. .................... 177/44; 177/178; 353/41
[51] Int. Cl.² .................. G01G 23/22; G01G 23/32; G03B 21/00
[58] Field of Search ........... 177/25, 44, 178; 353/41

[56] References Cited
UNITED STATES PATENTS
| | | | |
|---|---|---|---|
| 3,181,633 | 5/1965 | Worst | 177/44 |
| 3,489,233 | 1/1970 | Schwarz | 177/178 |
| 3,497,381 | 2/1970 | Teraoka | 177/178 |

FOREIGN PATENTS OR APPLICATIONS
| | | | |
|---|---|---|---|
| 965,079 | 5/1957 | Germany | 177/178 |

Primary Examiner—George H. Miller, Jr.
Attorney, Agent, or Firm—Michael S. Striker

[57] ABSTRACT

A weighing system includes a weight-dependently movable dial having a plurality of price scales each indicating the price-per-weight on the basis of a different unit price. A projection screen is provided, and an optical system is movable relative to the dial in dependence upon a selected unit price and operative for projecting onto the screen a portion of that price scale which is most closely associated with the selected unit price. An indicator arrangement indicates the price of a weighed item on the projected portion of a price scale on the screen. The arrangement is fixable so as to indicate the starting values and end values of the projected price scale under no-load and full-load conditions of the machine, respectively, and it is also selectively and weight-dependently movable so as to indicate the starting value by a different end value of the projected scale portion under the respective load conditions, the end value being based upon a unit price different from that assigned to the projected scale portion.

8 Claims, 8 Drawing Figures

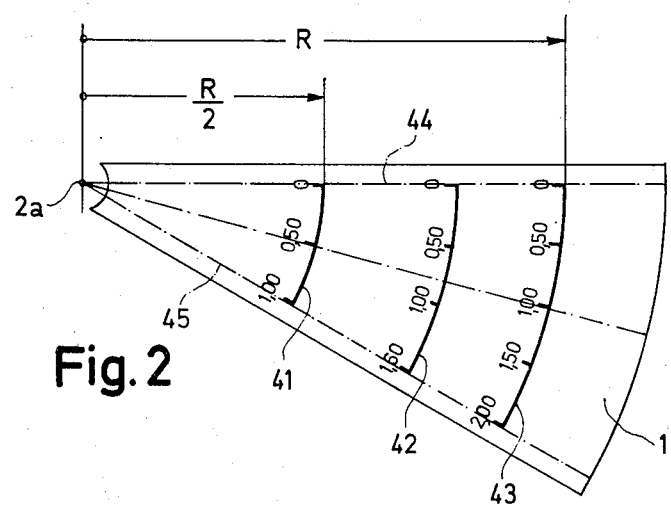
Fig. 2
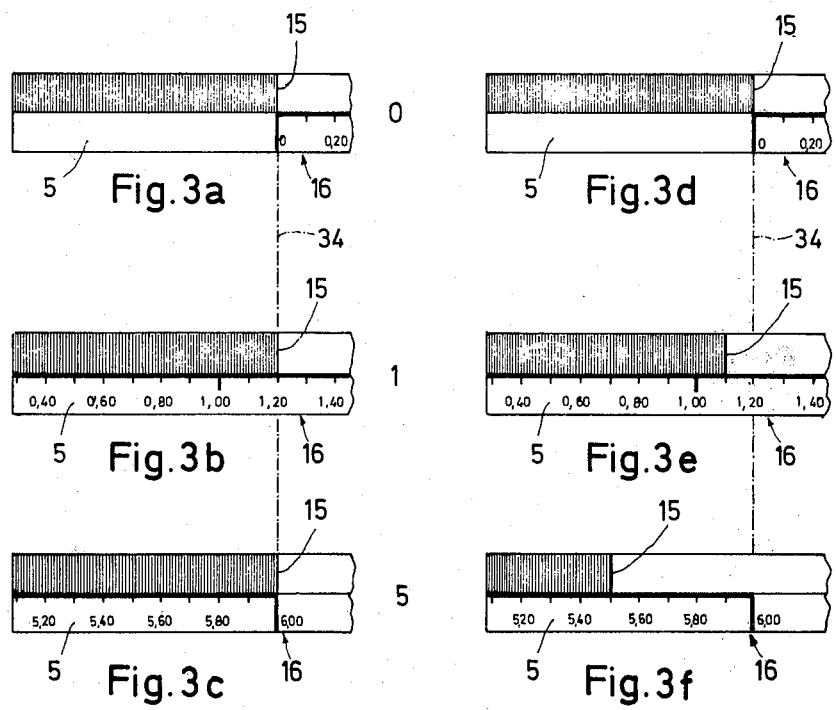

PRICE-INDICATING WEIGHING MACHINE

BACKGROUND OF THE INVENTION

The present invention relates to a price-indicating weighing machine, and more particularly to a price-indicating weighing machine of the type where the price of a weighed item is projected onto a screen.

Price-indicating weighing machines, wherein the price (and sometimes also the weight) of an item being weighed is projected onto a screen, are already known. Such screens are usually ground-glass screens which are provided with an indicator mark which indicates the particular weight and/or price that is applicable to a particular item being weighed. Such scales have a dial provided with weight and/or price indices in view of scale markings, and an optical reproducing system utilizing a lamp, a condenser lens, a weight-dependently movable dial carrier, and an objective, so that portions of a respective scale can be projected onto the screen. If necessary, mirrors or other optical means are provided in order to guide the light beam to the screen.

If the weight alone is to be indicated, then only a single dial provided with appropriate weight scales is required. However, if the weight and the price are to be indicated, then for each selectable unit price—that is the price per unit of weight of a commodity that is to be weighed with the machine—a separate price scale must be provided on the dial. This means that the dial must be provided with a plurality of such price scales which are usually provided on the dial in parallelism with one another, for example one above the other. The dial itself is movable in dependence upon a weight placed upon the scale, and the optical system which directs a light beam at the dial and projects a portion of a particular scale onto the screen, is movable in dependence upon the unit price of the commodity to be weighed, and can be fixed in a position in which only a single price scale (or portion thereof) is projected onto the scale, namely that price scale which corresponds to the unit price of the particular commodity.

It is the desire in industry to provide as many price scales as possible on a single dial, because of size considerations for the overall dimensions of a weighing machine. This permits the selection of many unit prices. However, the dial which constitutes a part of the weighing mechanism—and in known weighing machines may be rigidly connected with a lever arm of the weighing machine—may not exceed a certain size, for the reasons outlined above. Furthermore, the scales on the dial cannot be as small as might be desired in order to be able to utilize a small dial, because otherwise the manufacture of the dial with the scales thereon—which in any case is already a precision operation—would become so complicated as to be unacceptably difficult and expensive. Moreover, there is a limit to the extent to which a portion of a projected dial can be optically enlarged onto the screen, and this is dictated by the optical characteristics of the objective that is used and the short light path that is available in the usually small weighing machines. The greater the optical enlargement of a projected portion of the scale, the more nearly planar must the dial be, another requirement which makes the manufacture of such dials more complicated and more expensive. Finally, the light intensity of the projected portion on the screen decreases, when the size of the optical enlargement is increased, so that the projected portion on the screen becomes more difficult to read.

It follows from the above that the number of available price scales in the prior-art weighing machines, and therefore the subdivision of a price range into a variety of unit prices, is strictly limited. Attempts have been made to increase the number of available price scales, and therefore to provide more unit price indications, by providing two transparent dials both of which have price scales and which are arranged in two planes behind one another and at fixed spacing. In dependence upon the particular requirement, scales of one or the other of the dials are then projected onto the screen. Another proposal utilizes two transparent dials each provided with price scales, which are located directly one behind the other, and which are both simultaneously projected onto the screen. All of these arrangements, however, have significant disadvantages, particularly the fact that two different dials must be installed and adjusted, which complicates matters. Also, the increased weight may disadvantageously influence the weighing mechanism of the machine. The structures are quite complicated and the overall cost of such weighing machines is high.

SUMMARY OF THE INVENTION

It is an object of the invention to overcome the disadvantages of the prior art.

More particularly, it is an object of the present invention to provide a projector-type price-indicating weighing machine in which a price indication is possible for a number of different unit prices that is greater than the number of unit price scales provided on a single price-indicating dial.

In keeping with these objects, and with others which will become apparent hereafter, one feature of the invention resides in a price-indicating weighing machine which, briefly stated, comprises a weighing system including a weight-dependently movable dial having a plurality of price scales each indicating the price-per-weight on the basis of a different unit price. A projection screen in provided, and an optical system is movable relative to the dial in dependence upon a selected unit price and operative for projecting onto the screen a portion of that price scale which is most closely associated with the selected unit price. Indicator means is provided for indicating the price of a weighed item on the projected portion of a price scale on the screen, the indicator means being fixable so as to indicate the starting values and end values of the projected price scale under no-load and full-load conditions of the machine, respectively, and also being selectively and weight-dependently movable so as to indicate the starting value but a different end value of the projected scale portion under the respective load conditions, the end value being based upon a unit price different from that of the projected scale portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a side view of a currently preferred embodiment of a dial provided with the price scales; and FIGS. 3a-3f are diagrammatic views showing portions of a price scale projected onto a screen, and having an indicator mark associated with them, for indicating different weights and different unit prices.

DESCRIPTION OF THE PREFERRED EMBODIMENTS

Figure 1:
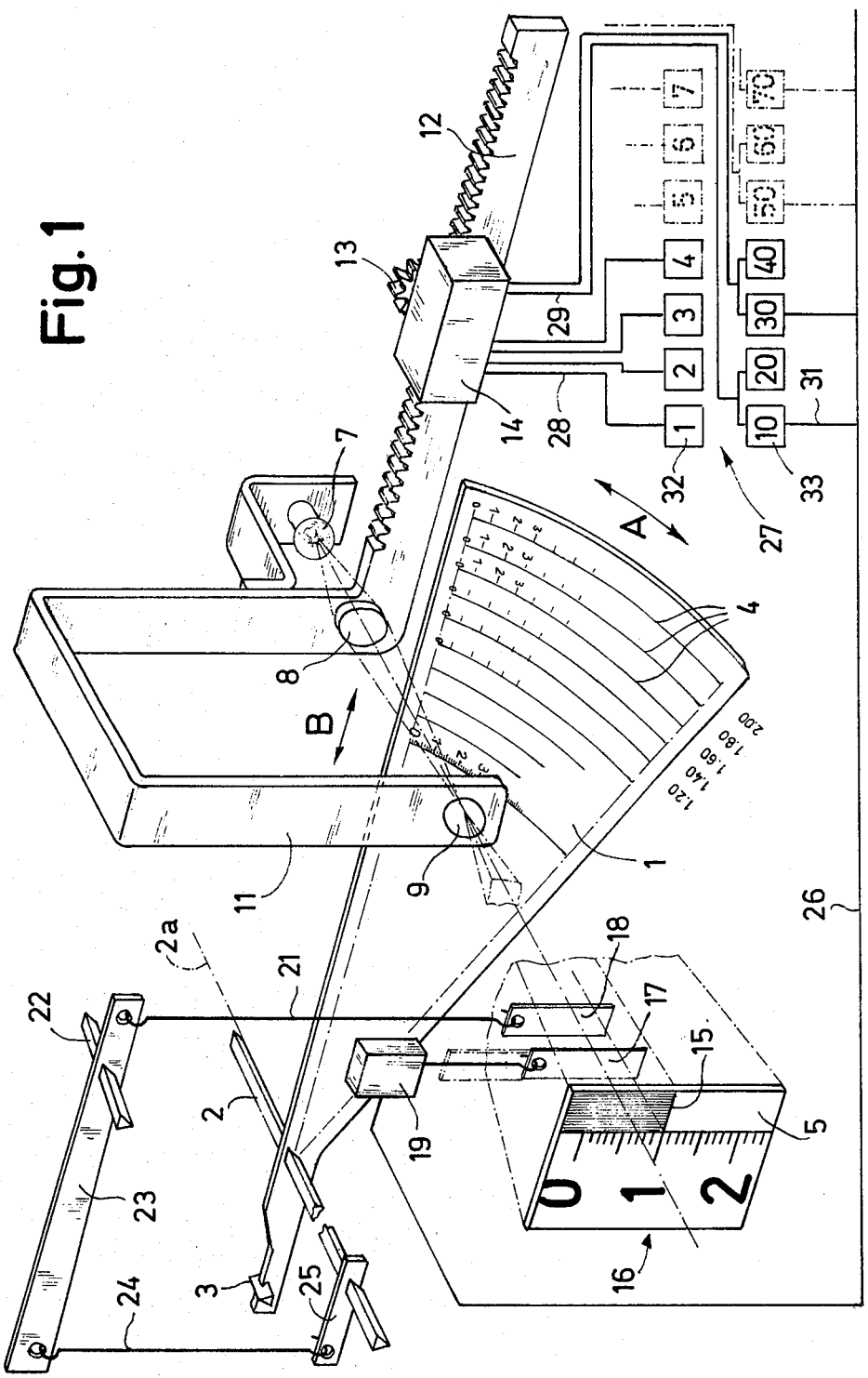
FIG. 1 is a diagrammatic illustration showing a portion of a weighing machine embodying the invention.

Referring now to the drawing in detail, and firstly to FIG. 1, it will be seen that reference numeral 1 identifies a dial of a weighing machine. The dial 1 is pivotally supported for movement about a pivot axis 2a, in a manner not separately illustrated because it is known, via a knife edge 2 which cooperates with a fixed stationary support. The dial 1 is further connected via a second knife edge 3 with a movable part of a weighing system, for example a swinging arm (not shown) and is displaced in direction of the double-headed arrow A through a certain angle which depends upon the weight of a commodity placed upon the weighing machine. Thus, the angular position of the dial 1 is a measure for the weight of the commodity. The dial 1 is of a transparent or translucent material, advantageously of glass, and it is provided with a plurality of price scales 4 each of which is associated with a particular unit price, that is a price per unit of weight of a particular commodity. Several such unit prices are indicated by way of example at the lower edge of the dial 1 in FIG. 1, e.g., $1.20 per pound, $1.40 per pound, etc.

The price scales 4 are projected onto a screen 5, such as a ground-glass screen, by means of an optical system which incorporates a lamp 7, a condenser lens 8 and an objective 9. In addition, mirrors, prisms or other means may be provided in order to so direct the light beam emanating from the lamp 7 that it will impinge upon the screen 5. Such systems are conventional and known from the prior art. In order to assure that at any given time only a single price scale 4 is projected onto the screen 5, the objective 9 together with the lamp 7 and the condenser lens 8 is movable in direction normal to the optical axis of the objective 9, and thereby normal to the light beam which extends from the lamp 9 to the objective and travels through the dial 1 in direction normal thereto. For this purpose, various measures are possible; for example, the objective 9, the lamp 7 and the condenser lens 8 may be mounted on a common support 11, which may be of U-shaped configuration, in such a manner that the dial 1 can freely pivot intermediate the legs of the support 11. The latter is connected via a rack 12 and a gear 13 with a gear motor 14 which, when energized by making a selection of a unit price on a set of keys 27, shifts the support 11 along a not illustrated guide and arrests it in such a position that the price scale 4 corresponding to the selected unit price (or closest to it) is projected onto the screen. Evidently, a linear shifting of the support 11 by means of the rack 12 is only a single example of how this can be accomplished, since various possibilities also exist and are known to those skilled in the art.

The screen 5 is connected with the housing of the weighing machine (not illustrated) and provided with an indicator 15 which indicates on the projected dial portion 16 the exact value in monetary terms, for example in FIG. 1 the value of 1.0 dollars. The indicator mark 15 is produced in the illustrated embodiment by the shadow of a mask or obstruction 17 which extends into the path of the projected light beam. In the illustrated embodiment, it is the lower edge of this shadow that constitutes the indicator mark 15.

According to the present invention, two of these masks or obstructions 17 and 18 are provided. The obstruction 17 normally is fixedly mounted to extend across the path of the beam of light but it can be withdrawn completely out of this path by means of an appropriate device, in the illustrated embodiment by an electromagnet 19 that is diagrammatically illustrated. FIG. 1 shows the obstruction 17 in full lines in the position in which it extends across the path of the beam of light, and in broken lines in the position in which it is fully withdrawn therefrom. The second obstruction is movable in the path of the beam of light in dependence upon the weight placed upon the weighing machine. For this purpose, the obstruction 18 is connected via a rod 21 with an arm 23 that is balanced via a knife edge 22 on a stationary support, and which is in turn connected via a further rod 24 with an arm 25 that is rigidly connected to the knife edge 2 of the dial 1. It is clear from this that when the dial 1 pivots about the axis 2a, this movement is transmitted via the arms 25 and 23 to the rod 21, which therefore either moves upwardly or downwardly so that the obstruction 18 extends across the path of the beam of light to a greater or lesser extent, depending upon the angular position of the dial 1. It is evident from FIG. 1 that the arrangement of the obstructions 17 and 18 one behind the other is such that when the obstruction 17 is in the full-line position shown in FIG. 1, it will completely cover the obstruction 18, irrespective of any position which the obstruction 18 may assume. Thus, the only shadow which is projected onto the screen 5, and whose lower edge forms the indicator mark 15, is the shadow of the obstruction 17. However, when the obstruction 17 is moved to the broken-line position in FIG. 1, then the shadow projected onto the screen 5 is that of the obstruction 18, and the indicator mark 15 is then formed by the lower edge of the shadow of the obstruction 18, and of course the mark 15 will move lengthwise of the projected scale portion 16 in dependence upon the movements of the obstruction 18, which in turn depend upon the angular movement of the dial 1 and are thus dependent upon the weight of the commodity placed upon the weighing machine. The obstructions 17 and 18 are so arranged that in the zero position of the weighing machine, that is when no weight is placed on the same, they will both produce the indicator mark 15 at one and the same location of the screen 5.

To obtain an exact price indication, it is important that the scale divisions corresponding to the same price difference will be of identical size from scale to scale, that is on all scale portions 16 that are projected onto the screen 5. For this purpose, the scale divisions on all price scales may be of identical size and the optical magnification is identical for all scales 4.

FIG. 2 shows a dial 1 having a plurality of price scales 41, 42 and 43. The dial 1 is pivotable about the axis 2a in keeping with the weight placed onto the weighing machine, that is it will assume different angular positions when different weights are placed onto the machine. The scales 41, 42 and 43 are configurated as concentric arcs whose center is located on the axis 2a. All starting values of the scales 41, 42 and 43 are located on a straight line 44 going through the several starting values and passing through the axis 2a; similarly, all terminal or end values on the respective scales 41, 42 and 43 are located on a straight line which passes through these end values and also through the axis 2a. The radii of the arcs have, with reference to one another, the same relationship as the end values of the respective scales 41, 42 and 43, and as the unit prices which are represented by these scales. By way of example this is shown in FIG. 2 by showing the radius R of the scale 43 having an end value of 2.0 (e.g., 2.0 dollars) and the radius R/2 of the scale 41 having an end value of 1.0 (e.g., 1.0 dollars). This assures that the scale divisions corresponding on the different scales to the same price differential are identical for all scales.

To obtain a constant magnification of all scales when the portions 16 are projected onto the screen 5, and when the objective 9 must be shifted with reference to the screen 5 in order to select a certain price scale which corresponds to the selected unit price, the light path from the objective 9 to the screen 5 must be constant. This can be accomplished in known manner, for example in that the light beam is directed to the screen 5 via mirrors or prisms which are moved in correspondence with the movement of the objective 9. Other devices for this purpose are also usable and known to the art, for example a turnable mounting of the support 11 in connection with a mirror which is arranged on an extension of the axis of turning and which projects the light beam onto the screen 5. FIG. 1 does not separately illustrate these known means since they do not represent any problems for those skilled in the art. FIG. 1 shows the path of the light beam in broken lines.

The electromagnet 19 which moves the obstruction 17 into and out of the path of the light beam, is connected with the set of keys 27 via a line 26. In the exemplary embodiment shown in FIG. 1, which is currently preferred, the set of keys 27 has a row of larger keys 32 which are associated with a larger unit of currency, for example $1.00, $2.00, $3.00, etc., and a row of keys 33 which are each associated with a fraction of this larger unit of currency, for example 10 cents, 20 cents, 30 cents, etc. This makes it possible to select unit price values which in the illustrated embodiment may differ from one another by as little as 10 cents per unit price. The keys 27 are also connected with the motor 14 which shifts the support 11 of the optical system. Thus, the keys 27 serve not only to shift the optical system in order to obtain the projection of a portion 16 of a selectable price scale 4, but also to move the obstruction 17 into or out of the path of the light beam traveling towards the screen 5.

According to the present invention not all of the unit prices that can be selected with the keys 27 have associated price scales 4 on the dial 1. Instead, as the indication of unit prices at the lower edge of the dial 1 in FIG. 1 indicates, only certain unit prices have corresponding scales 4 provided on the dial 1, for example price scales for the unit prices $1.20, $1.40, $1.60, $1.80 and $2.00 per unit of weight of a commodity may be provided, whereas no scales for the intermediate unit prices of $1.10, $1.30, $1.50, etc, are present. Nevertheless, the prices for these unit prices can also be projected onto the screen 5.

When the weighing machine according to the present invention is used, the operator first depresses the keys 27 which will select the desired unit price, for example $1.20. For this purpose, the key 32 for $1.00 and the key 33 for 20 cents is depressed. A line 28 connected with the key 32 and a line 29 connected with the key 33 each supply an electrical signal to the motor 14, causing the motor 14 to operate for the length of time required to shift the support 11 and the objective 9 mounted thereon to such a position that the scale 4 corresponding to the unit price of $1.20 is projected onto the screen 5. In this case, the obstruction 17 extends across the path of the light beam and produces with its lower edge, or rather with the lower edge of its shadow that is also projected onto the screen 5, the indicator mark 15 that is fixed and is not influenced by movements of the dial 1 and of the obstruction 18. Thus, the mark 15 indicates on the screen 5 with respect to the portion 16 of the projected scale 4 a price for the weighed commodity. FIGS. 3a, 3b and 3c show how the indication on the screen 5 will appear when a unit price of $1.20 is selected, and when no weight of a commodity acts upon the weighing machine, when a commodity weighing 1 kg is placed onto the weighing machine, and when a commodity of 5 kg (which is assumed to represent the highest weight that can be handled in the exemplary embodiment) is placed onto the machine. It will be seen that the mark 15 is always located at the line or position 34 and indicates in FIG. 3a a price of 0.00 dollars for 0 kg of weight, in FIG. 3b a price of $1.20 for 1 kg of weight, and in FIG. 3c a price of $6.00 for 5 kg of weight.

This same operation is used to select a different unit price for which a specific scale 4 is present on the dial 1, for example a unit price of $1.40, $1.60, etc.

If a unit price is to be selected for which no separate scale 4 is present on the dial 1, for example a unit price of $1.10, the operation is different. In this case, the motor receives via the line 28 and via the line 29 (which is connected both with the 10 cent and the 20 cent key) the same control signals as if a base or unit price of $1.20 was selected, causing the objective 9 to move to such a position that a portion 16 of the price scale for the unit price of $1.20 will be projected onto the screen 5. However, the key for 10 cents is also connected with the line 26 via a line 51, and the depressing of the 10 cent key causes the electromagnet 19 to be actuated and to retract the obstruction 17 from the light beam path, so that it will now be the shadow of the weight-dependently movable obstruction 18 that produces the indicator mark 15.

This movement of the obstruction 18 is a result of an appropriate selection in the length of the arms 25 and 23 in such a manner that, when there is no weight placed onto the weighing machine, the value 0 will be indicated, and when a unit weight (e.g., 1 kg) is placed onto the weighing machine, the unit price selected by operation of the keys 27 will be indicated. When a maximum weight is placed onto the scale (e.g., 5 kg as mentioned before) then the value indicated on the screen 5 will be five times the value of the unit price. The price scale 4 that is projected onto the screen 5 is actually associated with a different unit price than the one of $1.10 that has been selected, namely with the unit price of $1.20, so that if the obstruction 17 were still to extend into the path of the light beam, the price indications on the screen 5 given by the indicator mark 15 would be those corresponding to a unit price of $1.20. However, since the price indicating mark 15 is now produced by the shadow of the obstruction 18 which moves in dependence upon the weight placed upon the weighing machine, a price value will be indicated on the portion 16 projected onto the screen 5 which corresponds to the base price or unit price that has been preselected by means of the keyboard 27, that is in the example a unit price of $1.10. The same is true over the entire weighing range, since the weight-dependent movement of the obstruction 18 and therefore of the indicator mark 15 there will always be a precise correction of the deviation in the indication of the actual price, which in case of a fixed indicator mark 15 would develop due to the differential between the unit price ($1.20) associated with the projecting price scale 4 and the actual unit price that has been preselected with the keyboard 27. This means that the use of the movable obstruction 18 permits a price indication of a selected unit price on a price scale which is indicative of a unit price close to but not corresponding to the selected unit price. This is true of all unit prices for which no separate scale 4 are provided on the dial 1.

FIGS. 3d, 3d and 3f show how the price indication is obtained on a projected portion 16 of a scale 4 for the unit price of $1.20 when a unit price of $1.10 has been selected by means of the keyboard 27. FIG. 3d shows the condition when a weight of 0 kg acts upon the weighing machine, FIG. 3e shows a weight of 1 kg and FIG. 3f a weight of 5 kg. It will be recalled that the mark 15 moves as the obstruction 18 moves in dependence upon the weight, and the mark 15 indicates on the portion 16 of the scale 4 a price of 0.00 dollar for 0 kg of weight (see FIG. 3d), a price of $1.10 for 1 kg of weight in FIG. 3e, and a price of $5.50 for 5 kg of weight in FIG. 3f. Reference to the line 34, which indicates the position assumed by the indicator mark 15 when the mark does not move, that is when the mark is provided by the lower edge of the obstruction 17, will show in FIGS. 3e–3f that the movable mark 15 produced by the movable obstruction 18 shifts relative to the line 34 in dependence upon the weight on the weighing machine, so as to indicate on the scale 4 which is actually intended to show a unit price of $1.20, the value which corresponds to a unit price of $1.10.

Thus, a limited number of scales 4 on the dial 1 suffices to provide a price indication of a much larger number of unit prices, and it is not necessary to utilize a second dial, as is required in the prior art.

The movement of the obstruction 18 and therefore of the indicator mark 15 produced by the lower edge of its shadow, is uniform over the entire weighing range. Also, the magnitude of this movement is independent of which of the particular dials 4 is being projected onto the screen 5. It is therefore important that the increments of the respective scales be of identical size, as described earlier.

In the currently preferred embodiment, each scale 4 provided on the dial 1 always serves to indicate two unit prices, namely the unit price with which the scale 4 is associated, and a lower unit price, such as the unit price of $1.20 and the unit price of $1.10. Of course, it is conceivable to associate a single scale 4 with a larger number of unit prices, in which case the movement of the weight-dependently movable obstruction 18 must be carried out in a different way, for example by coupling the movement of the obstruction 18 via a switchable drive with the movement of the dial 1. It is also possible to provide several of the obstructions 18 which move to different extents in dependence upon weight, and which can be selectively brought into the path of the light beam. Depending upon how large the deviation of the unit price associated with the projected price scale is from the actual unit price that has been selected with the keyboard 27, the movement of the obstruction 18 and thereby the mark 15 produced by it, will be more or less pronounced.

Instead of the two obstructions 17 and 18, it is also possible to use a single obstruction which would then be either selectively fixed or moved in dependence upon weight. The keyboard 27 need not operate with electrical control pulses, but could also provide for mechanical displacement of the support 11 directly.

The correction of the price indication is effected by a weight-dependent movement of the indicator mark 15 that is projected onto the screen 5, in the currently preferred embodiment. However, it is also possible to always maintain the indicator mark 15 fixed, and instead to move the path of the light beam in dependence upon weight in such a manner that it will be the projected image of the scale portion 16 which moves with reference to the screen 5 and the fixed mark 15. This could be effected by means of a mirror or the like but can be either fixed or moved in dependence upon weight, as may be dictated by the particular unit price to be indicated.

It will be understood that each of the elements described above, or two or more together, may also find a useful application in other types of constructions differing from the type described above.

While the invention has been illustrated and described as embodied in a price-indicating weighing machine, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A price-indicating weighing machine, comprising a weighing system including a weight-dependently movable dial having a plurality of price scales each indicating the price-per-weight on the basis of a different unit price; a projection screen; an optical system movable relative to said dial in dependence upon a selected unit price and operative for projecting onto said screen a portion of that price scale which is most closely associated with said selected unit price; and indicator means for indicating the price of a weighed item on the projected portion of a price scale on said screen, said indicator means being fixable so as to indicate the starting values and end values of the projected price scale under no-load and full-load conditions of the machine, respectively, and also being selectively and weight-dependently movable so as to indicate the starting value but a different end value of the projected scale portion under said respective load condition, said end value being based upon a unit price different from that of the projected scale portion.

2. A weighing machine as defined in claim 1, wherein said dial is pivotable about a pivot axis.

3. A weighing machine as defined in claim 2, wherein said scales on said dial are located on respective arcs which are concentric to one another and to said pivot axis.

4. A weighing machine as defined in claim 1; further comprising means for selecting a unit price to be indicated on said screen.

5. A weighing machine as defined in claim 4, wherein said means comprises a drive for effecting shifting of said optical system relative to said dial to a portion in which it projects said price scale which is most closely associated with the selected unit price.

6. A weighing machine as defined in claim 5, wherein said means further comprises actuating means for fixing said indicator means when the projected price scale exactly represents the selected unit price, and for moving said indicator means weight-dependently when the projected price scale is only closely related to the selected unit price.

7. A weighing machine as defined in claim 6, wherein said actuating means comprises an electromagnet coupled with said indicator means.

8. A weighing machine as defined in claim 6, wherein said indicator means comprises a first opaque member movable between fixed positions in which it respectively extends across and is withdrawn from the path of a beam of projecting light, and a second opaque member extending across said path and being exposed when said first member is in said withdrawn position, said second member being movable in dependence upon the weight placed onto the weighing machine.

* * * * *